United States Patent [19]
Goncalves

[11] Patent Number: 5,487,411
[45] Date of Patent: Jan. 30, 1996

[54] LINER PIPE FOR REPAIR OF A HOST PIPE

[75] Inventor: Joseph E. F. Goncalves, Mississauga, Canada

[73] Assignee: Ipex Inc., Toronto, Canada

[21] Appl. No.: 345,727

[22] Filed: Nov. 22, 1994

[51] Int. Cl.⁶ ................................................. F16L 55/16
[52] U.S. Cl. ........................... 138/98; 138/97; 405/150.1
[58] Field of Search ........................ 138/97, 98, DIG. 7; 405/150.1; 264/36, 269; 156/187

[56] References Cited

U.S. PATENT DOCUMENTS

| | | | |
|---|---|---|---|
| 4,714,095 | 12/1987 | Müller et al. .............................. | 138/98 |
| 4,976,290 | 12/1990 | Gelin et al. ............................... | 138/98 |
| 4,986,951 | 1/1991 | Ledoux et al. ............................ | 138/97 |
| 5,034,180 | 7/1991 | Steketee, Jr. ............................. | 264/269 |
| 5,091,137 | 2/1992 | Ledoux .................................... | 138/97 |
| 5,167,258 | 12/1992 | Rice ........................................ | 138/98 |
| 5,265,648 | 11/1993 | Lyon ....................................... | 138/98 |
| 5,280,811 | 1/1994 | Catallo et al. ............................ | 138/98 |
| 5,334,429 | 8/1994 | Imoto et al. .............................. | 138/98 |
| 5,385,173 | 1/1995 | Gargiulo ................................. | 138/98 |
| 5,388,616 | 2/1995 | Müller et al. ............................. | 138/98 |

Primary Examiner—David Scherbel
Assistant Examiner—James F. Hook
Attorney, Agent, or Firm—Riches, McKenzie & Herbert

[57] ABSTRACT

This invention relates to liner pipes and to their use in the repair of pipes, preferably in the trenchless reconstruction of underground pipes such as sewer lines. The liner pipe of the present invention comprises two layers, an outer layer comprised of flexible thermoplastic material and an inner layer comprised of rigid thermoplastic material. When heated, the inner layer becomes sufficiently pliable to allow the cross-sectional shape and size of the liner pipe to conform to the inner cross-sectional shape and size of a host pipe. Because of its structure, the liner pipe of the present invention at least partially overcomes some of the disadvantages of prior art liner pipes relating to ease and expense of installation.

12 Claims, 3 Drawing Sheets

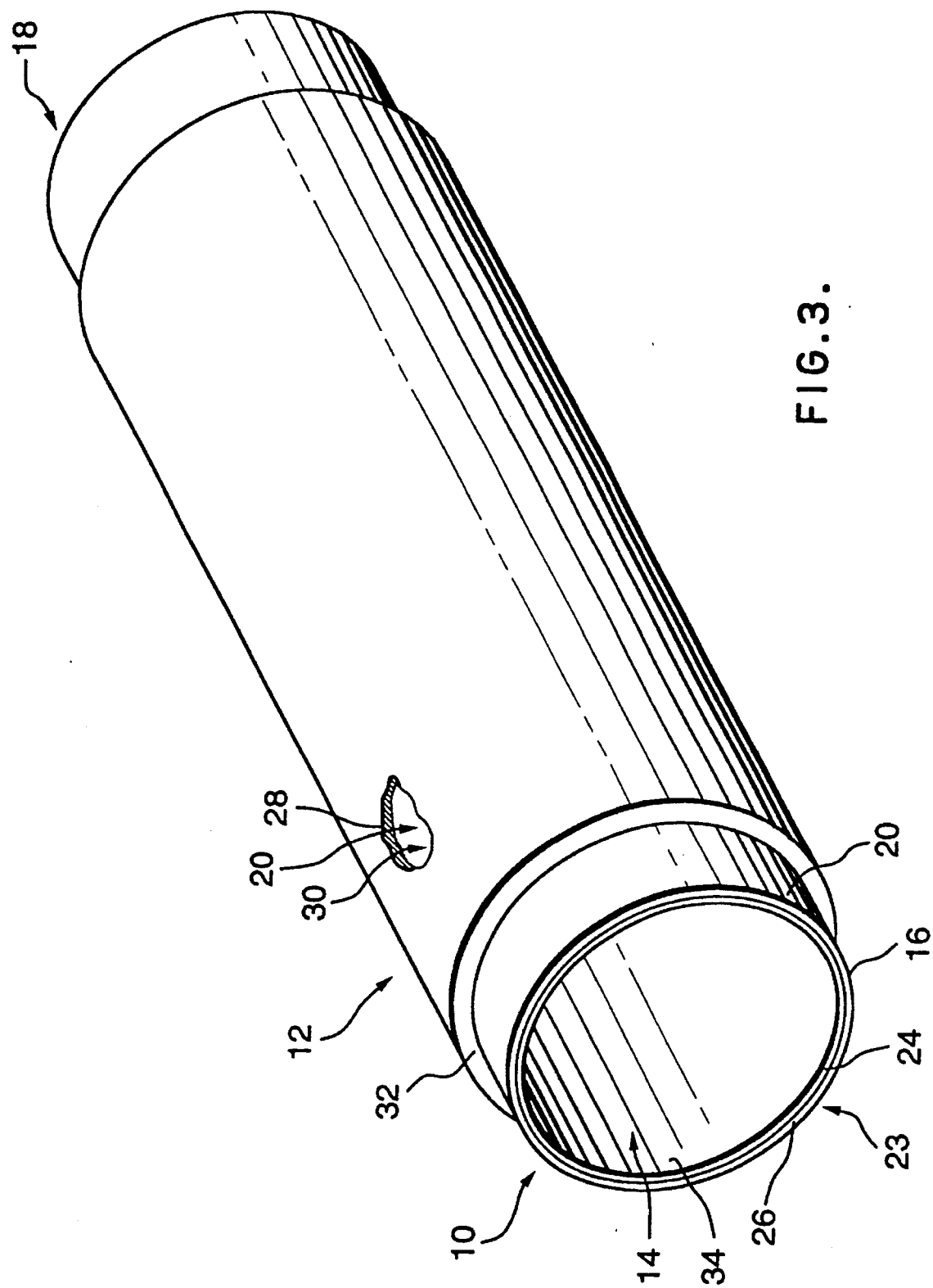

5,487,411

LINER PIPE FOR REPAIR OF A HOST PIPE

BACKGROUND OF THE INVENTION

This invention relates to liner pipes for use in the repair of pipes, and preferably for trenchless reconstruction of underground pipes such as sewer lines.

Deterioration of underground pipes due to aging is a major problem. Aging of underground pipes results in corrosion, loose joints, cracks, holes and missing sections in pipes. Excavation and replacement of deteriorated underground pipes such as sewer lines is extremely costly, time consuming and disruptive to traffic, utilities and other activities in the area surrounding the excavation site.

Prior art liner pipes have been developed for "trenchless" reconstruction of underground pipes, completely eliminating the need for excavation in most cases. Liner pipes are typically inserted into a damaged section of pipe from above ground at an end of the pipe to be repaired. The damaged pipe into which the liner pipe is inserted is typically referred to as the "host" pipe. After insertion, the liner pipe is molded to conform to the inner size and shape of the host pipe, thus effectively providing it with a new lining.

During manufacturing of a typical prior art liner pipe, the cross-sectional size and shape of the liner pipe is substantially reduced by deformation. This typically involves folding the liner pipe along its longitudinal axis, giving it a U-shaped cross-section and a substantially reduced cross-sectional area and size. This reduced cross-sectional shape and size allows the liner pipe to be smoothly inserted into the host pipe.

After insertion into the host pipe, the liner pipe is unfolded to increase its cross-sectional size and shape and conform it to the inner cross-sectional shape and size of the host pipe.

Typically, the prior art liner pipe is rigid when inserted and the entire liner pipe must be softened by heating before it can be unfolded. In one prior art method, heat is applied by passing pressurized steam through the liner pipe, thus heating the pipe from the inside only. As a result, more heat is applied to the inner surface of the liner pipe than the outer surface, and the inner surface becomes softer than the outer surface. This uneven heating causes uneven expansion of the liner pipe, and can result in gaps being left between the outside of the liner pipe and the inner surface of the host pipe.

one prior art system has been developed which simultaneously heats both the inside and outside of the liner pipe. This produces even heating, resulting in even expansion and a tight fit of the liner pipe inside the host pipe.

This prior art system utilizes a thin, flexible plastic sleeve which is first inserted into the host pipe. A conventional, prior art folded liner pipe is inserted into the sleeve so that the sleeve completely surrounds the liner pipe. Pressurized steam is passed through the sleeve, evenly heating both the inside and outside of the liner pipe.

The even heating of the liner pipe achieved by this system results in even expansion and a high quality installation, with the liner pipe fitting tightly inside the host pipe.

However, the sleeve cannot be recovered and reused after installation of the liner pipe. The sleeve remains inside the host pipe between the host pipe and the installed liner pipe. The use of a new sleeve for each installation increases the material cost of the repair process. Further, the extra step of inserting the sleeve into the host pipe substantially increases the labour and the time required for the installation.

The prior art liner pipes and methods have disadvantages, some of which are discussed above, which relate to ease and expense of installation.

SUMMARY OF THE INVENTION

Accordingly, it is an object of the present invention to at least partially overcome the disadvantages of the prior art. Therefore, it is an object of this invention to provide an improved type of liner pipe and a method for its installation.

Accordingly, in one of its broad aspects, the present invention resides in providing a liner pipe for repair of a host pipe; the liner pipe having a hollow inside; a length defining a longitudinal axis; and a cross-sectional shape and size in a plane transverse to the longitudinal axis; the cross-sectional shape and size of the liner pipe being such that the liner pipe can be fed through the host pipe; the liner pipe comprising an inner layer and an outer layer; the outer layer being comprised of flexible thermoplastic material; and the inner layer being comprised of rigid thermoplastic material which, when heated, becomes sufficiently pliable to allow the cross-sectional shape and size of the liner pipe to conform to an inner cross-sectional shape and size of the host pipe.

Also, in another of its broad aspects, the present invention resides in providing a method for using a liner pipe to repair a host pipe having a section to be repaired, said method comprising: feeding a liner pipe into a position in the host pipe so that the liner pipe covers substantially the entire section to be repaired; wherein the liner pipe has a hollow inside, a length defining a longitudinal axis, a cross-sectional shape and size in a plane transverse to the longitudinal axis which allows the liner pipe to be fed through the host pipe, an outer layer comprising flexible thermoplastic material, and an inner layer comprising rigid thermoplastic material; heating the inner layer of the liner pipe to an extent whereby the inner layer of the liner pipe is softened; conforming the cross-sectional shape and size of the liner pipe to an inner cross-sectional shape and size of the host pipe while the inner layer is softened; and cooling the liner pipe so that the inner layer becomes rigid.

BRIEF DESCRIPTION OF THE DRAWINGS

Further aspects and advantages of the present invention will become apparent from the following description, taken together with the accompanying drawings, in which:

FIG. 3 illustrates the liner pipe and host pipe of FIGS. 1 and 2, wherein the liner pipe is fully unfolded.

DESCRIPTION OF THE PREFERRED EMBODIMENTS

Preferred embodiments of the present invention are now described with reference to FIGS. 1 to 3.

The liner pipe and method for its installation according to the present invention are most advantageous in the repair of underground pipes. However, they can be used with equal success to repair pipes above ground.

Most preferably, the liner pipe and method of its installation according to the present invention are used in the repair of underground sewer pipes for sanitary sewers or storm sewers. However, the liner pipe and method of the present invention may also be used in the repair of pipes for transfer of a wide variety of gas and liquid materials, such as water, oil and gas pipelines.

Figure 1:
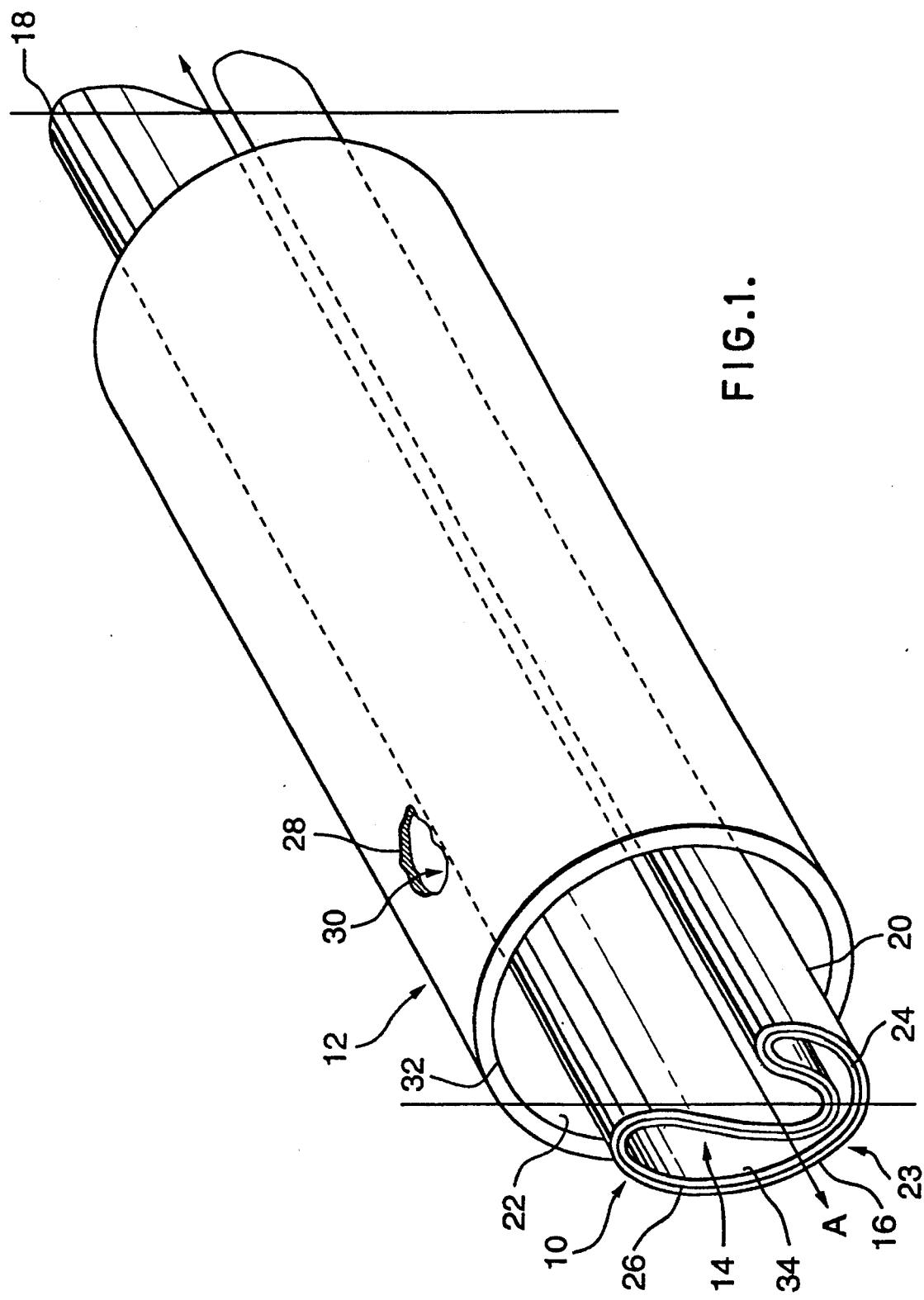
FIG. 1 is a front perspective view of a fully folded liner pipe according to the present invention received in a host pipe according to a preferred method of the present invention.
Figure 2:
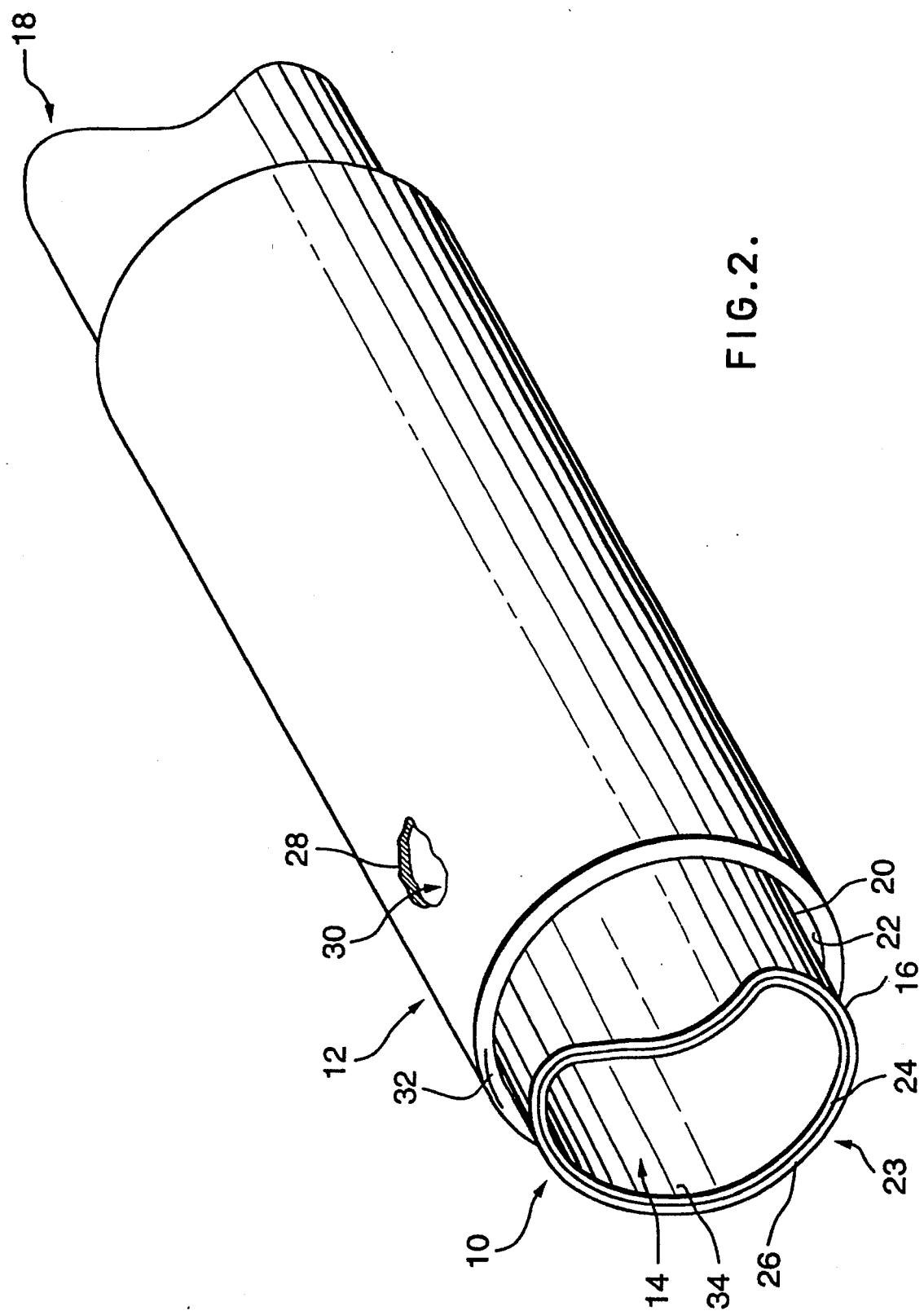
FIG. 2 is a front perspective view of the liner pipe and host pipe of FIG. 1, wherein the liner pipe has been partially unfolded.

FIGS. 1 to 3 schematically illustrate three successive stages in a preferred method of repairing a host pipe having a section to be repaired according to the present invention.

FIG. 1 illustrates a liner pipe 10 of the present invention, prior to softening, inserted into a host pipe 12. Liner pipe 10 has a hollow inside 14 and a length L which is shown as being the distance between a first end 16 of liner pipe 10 and a second end 18 of liner pipe 10.

The liner pipe 10 has a longitudinal axis A which is defined by and parallel to the length L of liner pipe 10. In any plane transverse to the longitudinal axis A, for example the plane in which the first end 16 of liner pipe 10 lies, the cross-sectional shape and size of the liner pipe 10 allows the liner pipe 10 to be fed through the host pipe 12.

In FIG. 1, the cross-sectional size of liner pipe 10 is defined as the outer cross-sectional area of liner pipe 10 enclosed by outer surface 20 of liner pipe 10. The cross-sectional shape of liner pipe 10 is defined as the shape of the outer cross-sectional area enclosed by outer surface 20 of liner pipe 10. FIG. 1 illustrates a preferred U-shaped cross-sectional shape of liner pipe 10, wherein the liner pipe 10 is "folded" along its longitudinal axis A.

In contrast, host pipe 12 has an inner cross-sectional size which is defined as the cross-sectional area enclosed by the inner surface 22 of host pipe 12 in a plane perpendicular to longitudinal axis A. The inner cross-sectional shape of host pipe 12 is shown in FIG. 1 as being circular.

Prior to softening, the liner pipe 10 has an outer cross-sectional area less than the inner cross-sectional area of the host pipe 12.

As shown in FIG. 1, the cross-sectional size of host pipe 12 is substantially larger than that of liner pipe 10. Preferably, the cross-sectional size of liner pipe is not greater than about 60 percent of the cross-sectional size of host pipe 12. This ensures that liner pipe 10 may be easily inserted into host pipe 12. Further, the cross-sectional shape of liner pipe 10 shown in FIG. 1 is such that the liner pipe 10 may be easily inserted into host pipe 12. Easy insertion of liner pipe 10 into host pipe 12 is preferable so that neither liner pipe 10 nor host pipe 12 are damaged during the installation of liner pipe 10.

The liner pipe 10 according to the present invention has a wall 23 comprised of two layers, an inner layer 24 and an outer layer 26. Inner layer 24 is comprised of a rigid thermoplastic material, whereas outer layer 26 is comprised of a flexible thermoplastic material.

The layers 24 and 26 of liner pipe 10 can be made from a wide range of thermoplastic materials, with PVC, polyethylene, polypropylene, polystyrene and blends thereof being preferred.

For a liner pipe 10 used in the repair of sewer pipes, the layers 24 and 26 are preferably made from polyethylene or PVC. Most preferred is PVC, which is also widely used in the manufacture of sewer pipes. As typical ambient temperatures encountered in sewer lines typically range from about −20° C. to about 40° C., it is preferred that inner layer 24 is rigid and outer layer 26 is flexible throughout this temperature range.

The thickness of wall 23 of liner pipe 10 is preferably about the same thickness as that of prior art liner pipes. Preferably, inner layer 24 and outer layer 26 have substantially the same thickness.

When heated, the rigid thermoplastic material comprising inner layer 24 becomes sufficiently pliable to allow the cross-sectional shape and size of the liner pipe 10 to conform to the inner cross-sectional shape and size of host pipe 12.

FIG. 1 schematically illustrates a first step in a method for using liner pipe 10 to repair host pipe 12 according to the present invention. FIG. 1 illustrates host pipe 12 having a section to be repaired 28 comprising a hole 30 completely through the wall 32 of host pipe 12. Although hole 30 represents a common type of defect in host pipes, liner pipe 10 and the method for its installation according to the present invention can be used in the repair of host pipes having numerous other defects, such as cracks, leaking joints and missing sections.

In the first step of the method shown in FIG. 1, liner pipe 10 is fed into a position in host pipe 12 so that the liner pipe 10 covers substantially the entire section to be repaired, i.e. the ends 16 and 18 of liner pipe 10 extend in the host pipe 12 on either side of the section to be repaired 28.

After the liner pipe 10 is inserted into host pipe 12 as schematically illustrated in FIG. 1, the inner layer 24 of liner pipe 10 is heated to an extent whereby inner layer 24 is softened. Preferably, liner pipe 10 is heated from the inside 14 only.

Preferably, inner layer 24 is heated by steam heat, and most preferably by passing pressurized steam through the hollow inside 14 of liner pipe 10. However, it is to be understood that other methods of heating may be equally suitable. For example, hot water, electricity and exothermic chemical reactions can be used to heat and soften inner layer 24.

The softening temperature of the thermoplastic and the time required to soften inner layer 24 can be altered by changing the composition of the thermoplastic material. For example, additives such as heat conducting materials may be added to the thermoplastic to increase heat conductivity and the heating rate of the thermoplastic material. Further, a lower softening temperature may be desired to increase the softening rate of the inner layer 24 or to adapt the liner pipe 10 to use with a cooler heating medium.

After the inner layer 24 of liner pipe 10 is softened, the cross-sectional shape and size of the liner pipe 10 are conformed to the inner cross-sectional shape and size of the host pipe 12. Conforming the cross-sectional shape and size of the liner pipe 10 may be accomplished by any other suitable method.

The preferred method of conforming inner layer 24 is to pressurize the hollow inside 14 of liner pipe 10 with pressurized steam. The pressurized steam exerts pressure on the inner surface 34 of liner pipe 10, thereby pushing the wall 23 of the liner pipe 10 outward in the direction of the inner surface 22 of host pipe 12.

Compressed air can also be used for pressurizing the hollow inside 14 of liner pipe 10. However, pressurized steam is most preferred because it functions to simultaneously heat and pressurize the inside 14 of liner pipe 10.

Liner pipe 10 is preferably forced to conform to the cross-sectional shape and size of the host pipe 12 by pressurizing the inside 14 of liner pipe 10 while the inner layer 24 is in a softened state. However, it is to be understood that it is not necessary to pressurize liner pipe 10.

Liner pipe 10 may be conformed to the shape and size of the host pipe 12 by other suitable means. For example, a cylindrical object may be forced through the hollow inside 14 of the softened inner layer 24 to conform the liner pipe 10 to the inner shape and size of the host pipe 12.

FIG. 2 schematically illustrates an intermediate stage in the preferred method. In this stage of the process, liner pipe 10 has been partially "unfolded" so that its cross-sectional size has expanded from that shown in FIG. 1. As shown in FIG. 2, the cross-sectional shape of liner pipe 10 is no longer U-shaped, but rather is approximately "kidney-shaped" approaching the circular cross-sectional shape of the host pipe 12.

Although the cross-sectional size of liner pipe 10 expands, preferably this expansion results only from the "unfolding" of liner pipe 10, rather than stretching of layers 24 and 26.

When softened, the inner layer 24 preferably has a flexibility similar to that of the outer layer 26, resulting in even expansion of the cross-sectional shape and size of liner pipe 10. This results in a high quality installation with a tight fit of the liner pipe 10 inside host pipe 12.

FIG. 3 schematically illustrates a final stage in the method for using liner pipe 10 to repair host pipe 12 having a section to be repaired 28. At this stage, the cross-sectional shape and size of the liner pipe 10 has been substantially completely conformed to the inner cross-sectional shape and size of the host pipe 12. As shown in FIG. 3, the cross-sectional shape of liner pipe 10 is substantially circular, the same as the inner cross-sectional shape of host pipe 12. Further, the cross-sectional size of liner pipe 10 is substantially identical to the inner cross-sectional size of host pipe 12. The outer periphery of the liner pipe 10, defined as the distance around outer surface 20, is substantially equal to the inner periphery of the host pipe 12, defined as the distance around inner surface 22. Therefore, liner pipe 10 is tightly received inside host pipe 12, with outer surface 20 of liner pipe 10 firmly engaging the inner surface 22 of host pipe 12.

As shown in FIG. 3, liner pipe 10 has completely closed the hole 30 in liner pipe 12.

After the cross-sectional shape and size of liner pipe 10 have been substantially completely conformed to the inner cross-sectional shape and size of host pipe 12, the liner pipe 10 is cooled so that the inner layer 24 of liner pipe 10 becomes rigid. In the most preferred embodiment, the liner pipe 10 is cooled by passing compressed air through the hollow inside 14 of liner pipe 10. However, cooling may also be conducted by other suitable means, such as by liquid coolants or by allowing the liner pipe to cool merely through the action of surrounding air circulating through the inside 14 of liner pipe 10.

The inner layer 24 of liner pipe 10 preferably has a very smooth inner surface 34 which serves as an inhibitor for any future buildup of foreign material that could reduce flow capacity.

Although the invention has been described in connection with certain preferred embodiments, it is not intended to be limited thereto, rather, it is intended that the invention cover all alternate embodiments as may be within the scope of the following claims.

The embodiments of the invention in which an exclusive property or privilege is claimed are defined as follows:

1. A liner pipe for repair of a host pipe;
the liner pipe having a hollow inside; a length defining a longitudinal axis; and a cross-sectional shape and size in a plane transverse to the longitudinal axis;
the cross-sectional shape and size of the liner pipe being such that the liner pipe can be fed through the host pipe; the liner pipe comprising an inner layer and an outer
the outer layer being comprised of flexible thermoplastic material; and
the inner layer being comprised of rigid thermoplastic material which, when softened by heating to attain a flexibility similar to that of the outer layer, becomes sufficiently pliable to allow the cross-sectional shape and size of the liner pipe to conform to an inner cross-sectional shape and size of the host pipe.

2. The liner pipe of claim 1 wherein the cross-sectional shape of the liner pipe before being heated is U-shaped.

3. The liner pipe of claim 2 wherein an outer periphery of the liner pipe after being heated is substantially equal to an inner periphery of the host pipe.

4. The liner pipe of claim 3 wherein the thermoplastic material comprising the inner and outer layers is polyvinyl chloride.

5. A method for using a liner pipe to repair a host pipe having a section to be repaired,
said method comprising:
feeding a liner pipe into a position in the host pipe so that the liner pipe covers substantially the entire section to be repaired; wherein the liner pipe has a hollow inside, a length defining a longitudinal axis, a cross-sectional shape and size in a plane transverse to the longitudinal axis which allows the liner pipe to be fed through the host pipe, an outer layer comprising flexible thermoplastic material, and an inner layer comprising rigid thermoplastic material;
heating the inner layer of the liner pipe to an extent whereby the inner layer of the liner pipe is softened and attains a flexibility similar to that of the outer layer;
conforming the cross-sectional shape and size of the liner pipe to an inner cross-sectional shape and size of the host pipe while the inner layer is softened; and
cooling the liner pipe so that the inner layer becomes rigid.

6. The method of claim 5 wherein, prior to softening, the liner pipe has an outer cross-sectional area less than an inner cross-sectional area of the host pipe.

7. The method of claim 6 wherein the cross-sectional shape of the liner pipe before being heated is U-shaped.

8. The method of claim 7 wherein an outer periphery of the liner pipe after being heated is substantially equal to an inner periphery of the host pipe.

9. The method of claim 8 wherein the liner pipe is heated from the inside only.

10. The method of claim 9 wherein the inner layer is heated by steam heat.

11. The method of claim 10 wherein the thermoplastic material comprising the inner and outer layers is polyvinyl chloride.

12. The method of claim 8 wherein the liner pipe is forced to conform to the cross-sectional shape and size of the host pipe by pressurizing the inside of the liner pipe while the inner layer is in a softened state.

\* \* \* \* \*